US007429863B2

(12) United States Patent
Carmichael et al.

(10) Patent No.: US 7,429,863 B2
(45) Date of Patent: Sep. 30, 2008

(54) METHOD AND APPARATUS FOR MAINTAINING EMISSION CAPABILITIES OF HOT CATHODES IN HARSH ENVIRONMENTS

(75) Inventors: Larry K. Carmichael, Platteville, CO (US); Michael D. Borenstein, Boulder, CO (US); Paul C. Arnold, Boulder, CO (US); Stephen C. Blouch, Boulder, CO (US); Richard A. Knott, Broomfield, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 245 days.

(21) Appl. No.: 11/488,457

(22) Filed: Jul. 18, 2006

(65) Prior Publication Data

US 2008/0018337 A1 Jan. 24, 2008

(51) Int. Cl.
*G01N 27/62* (2006.01)
*G01L 21/30* (2006.01)

(52) U.S. Cl. ......................... 324/460; 324/459; 315/95; 315/108

(58) Field of Classification Search ................. 324/459, 324/460
See application file for complete search history.

(56) References Cited

U.S. PATENT DOCUMENTS

| | | | | |
|---|---|---|---|---|
| 3,153,744 | A * | 10/1964 | Torney, Jr. | 315/111.91 |
| 3,591,827 | A * | 7/1971 | Hall | 315/108 |
| 4,018,489 | A | 4/1977 | Miller et al. | |
| 4,412,153 | A | 10/1983 | Kalbfus et al. | |
| 5,256,947 | A | 10/1993 | Toy et al. | |
| 5,438,238 | A | 8/1995 | Toy et al. | |
| 6,054,862 | A | 4/2000 | Zhou | |
| 6,525,482 | B2 * | 2/2003 | Miyamoto | 315/111.81 |
| 6,566,884 | B2 * | 5/2003 | Rutherford et al. | 324/460 |
| 7,030,619 | B2 * | 4/2006 | Arnold et al. | 324/460 |
| 2005/0140375 | A1 | 6/2005 | Liu | |
| 2006/0012373 | A1 * | 1/2006 | Edelmann et al. | 324/460 |

FOREIGN PATENT DOCUMENTS

| | | |
|---|---|---|
| JP | 57019949 | 2/1982 |
| WO | WO 2005/045877 A1 | 5/2005 |

* cited by examiner

*Primary Examiner*—Vincent Q. Nguyen
*Assistant Examiner*—John Zhu
(74) *Attorney, Agent, or Firm*—Hamilton, Brook, Smith & Reynolds, P.C.

(57) ABSTRACT

A method and apparatus for operating a multi-hot-cathode ionization gauge is provided to increase the operational lifetime of the ionization gauge in gaseous process environments. In example embodiments, the life of a spare cathode is extended by heating the spare cathode to a temperature that is insufficient to emit electrons but that is sufficient to decrease the amount of material that deposits on its surface or is optimized to decrease the chemical interaction between a process gas and a material of the at least one spare cathode. The spare cathode may be constantly or periodically heated. In other embodiments, after a process pressure passes a given pressure threshold, plural cathodes may be heated to a non-emitting temperature, plural cathodes may be heated to a lower emitting temperature, or an emitting cathode may be heated to a temperature that decreases the electron emission current.

24 Claims, 4 Drawing Sheets

300

| | CATHODE STATUS OPTIONS (321) | | | |
|---|---|---|---|---|
| CATHODE (311) | I (323) | II (325) | III (327) | IV (329) |
| CATHODE 1 | Emitting | Heated only | Heated only | Emitting |
| CATHODE 2 | Heated only | Emitting | Heated only | Emitting |

FIG. 3

METHOD AND APPARATUS FOR MAINTAINING EMISSION CAPABILITIES OF HOT CATHODES IN HARSH ENVIRONMENTS

BACKGROUND OF THE INVENTION

The most common hot-cathode ionization gauge is the Bayard-Alpert (B-A) gauge. The B-A gauge includes at least one heated cathode (or filament) that emits electrons toward an anode, such as a cylindrical wire grid, defining an anode volume (or ionization volume). At least one ion collector electrode is disposed within the ionization volume. The anode accelerates the electrons away from the cathode towards and through the anode. Eventually, the electrons are collected by the anode.

In their travel, the energetic electrons impact gas molecules and atoms and create positive ions. The ions are then urged to the ion collector electrode by an electric field created in the anode volume by the anode, which may be maintained at a positive 180 volts, and an ion collector, which may be maintained at ground potential. A collector current is then generated in the ion collector as ionized atoms collect on the ion collector. The pressure of the gas within the ionization volume can be calculated from ion current ($I_{ion}$) generated in the ion collector electrode and electron current ($I_{electron}$) generated in the anode by the formula $P=(1/S)(I_{ion}/I_{electron})$, where S is a constant with the units of 1/Torr (or any other units of pressure, such as 1/Pascal) and is characteristic of gas type and a particular gauge's geometry and electrical parameters.

The operational lifetime of a typical B-A ionization gauge is approximately ten years when the gauge is operated in benign environments. However, these same gauges fail in hours or even minutes when operated at high pressures or in gas types that degrade the emission characteristics of the gauge's cathodes.

In general, two processes may operate to degrade or destroy the emission characteristics of the gauge's cathodes. These processes may be referred to as coating and poisoning. In the coating process, other materials which do not readily emit electrons coat or cover the emitting surfaces of the gauge's cathodes. The other materials may include gaseous products of a process occurring in a vacuum chamber. The other materials may also include material removed or sputtered off from surfaces of the gauge that are at or near ground potential when ionized atoms and molecules impact these surfaces.

For example, heavy ionized atoms and molecules, such as argon, from an ion implant process, may sputter off tungsten from a tungsten collector and stainless steel from the stainless steel shield located at the bottom of the ionization gauge. As the pressure increases, there is an increase in density per unit volume of the argon atoms and, as a result, more material from the ionization gauge surfaces is sputtered off. This sputtered material, such as tungsten and stainless steel, may then deposit on other surfaces of the ionization gauge that are in a line-of-sight, including the cathodes. In this manner, the electron emission characteristics of the cathodes are degraded and even destroyed.

In the poisoning process, the emitting material of the gauge's cathodes may chemically react with gasses from a process occurring in a vacuum chamber so that the emitting material no longer readily emits electrons. The emitting material of the cathodes may include (1) an oxide-coated refractory metal that operates at about 1800 degrees Celsius or (2) nominally pure tungsten that operates at about 2200 degrees Celsius. The oxide coating may include yttrium oxide ($Y_2O_3$) or thorium oxide ($ThO_2$) and the refractory metal may include iridium.

In one example, process gasses can chemically react with a cathode's oxide coating to degrade or destroy the cathode's ability to emit electrons. Specifically, when an yttrium oxide-coated cathode or a thorium oxide-coated cathode is heated, the yttrium or thorium atoms diffuse to the surface of the cathode and emit electrons. Process gasses can continually oxidize the yttrium or thorium atoms and dramatically reduce the number of electrons generated by the cathode.

Users do not want to stop their process to change gauges (or cathodes for gauges with removable cathodes) if they don't have to because that means down time, rework time, re-commission time, re-validate time, and so forth. Users would prefer to change gauges at their convenience, for example, when they do their preventative maintenance work. It is at this point that the user changes the ionization gauge and starts over with a new ionization gauge having new cathodes.

In order to increase the overall operational lifetime of an ionization gauge, second, backup or spare cathodes have been added to ionization gauges. The spare cathode may be a second half of a cathode assembly that includes two halves electrically tapped at a mid-point. In multi-cathode hot-cathode ionization gauges, gauge electronics or a gauge controller may operate one cathode at a time. For example, the gauge controller may use a control algorithm that allows the ionization gauge to alternate automatically or manually between the emitting and spare cathodes. However, in some applications, the electron emitting surface of the cathodes not being used can become poisoned and/or coated by a process. As a result, the ionization gauge control circuitry may turn off if it cannot cause the cathode to generate a desired electron emission current. Also, the cathode may become an open circuit (i.e., "burn out") if the control circuitry overpowers the cathode in order to begin and sustain a desired electron emission current from the cathode surface.

SUMMARY OF THE INVENTION

An example method of measuring a gas pressure from gas molecules and atoms according to one embodiment further increases the overall operational lifetime of a hot-cathode ionization gauge by heating at least one cathode to a first temperature to generate electrons and heating at least one other cathode to a second temperature less than the first temperature. The electrons impact gas molecules and atoms to form ions in an anode volume. The ions are then collected to provide an indication of the gas pressure.

An example ionization gauge according to another embodiment includes at least two cathodes, an anode that defines an anode volume, and at least one ion collector electrode. Control circuitry connects to the at least two cathodes and heats at least one cathode (e.g., an emitting cathode) to a first temperature and heats at least one other cathode (e.g., a non-emitting or spare cathode) to a second temperature that is insufficient to emit electrons from the at least one other cathode. In a B-A gauge embodiment, the at least one ion collector electrode may be located inside of the anode volume and the at least two cathodes may be located outside of the anode volume. In a triode gauge embodiment, the at least one ion collector electrode may be located outside of the anode volume and the at least two cathodes may be located inside of the anode volume.

In one example embodiment of an ionization gauge, the first temperature is sufficient to emit electrons from at least one emitting cathode and the at least one ion collector electrode collects ions formed by impact between the electrons and gas atoms and molecules in the anode volume. In various embodiments, at least one spare cathode may be heated to a temperature of between about 200 degrees Celsius and 1000 degrees Celsius. The at least one spare cathode may also be heated to a constant temperature or a variable temperature. Furthermore, the at least one spare cathode may be heated constantly or periodically to the constant or variable temperature.

In some embodiments, the control circuitry may heat at least one spare cathode by alternating between constantly heating the at least one spare cathode and periodically heating the at least one spare cathode. In other embodiments, the control circuitry may alternate (i) between heating the at least one emitting cathode to the first temperature and the at least one spare cathode to the second temperature and (ii) heating the at least one spare cathode to the first temperature and the at least one emitting cathode to the second temperature.

The control circuitry may heat the at least one spare cathode to a temperature that is sufficient to decrease the amount of material that deposits on its surface or is optimized to decrease the chemical interaction between a process gas and a material of the at least one spare cathode. In one embodiment, the control circuitry may heat the at least one emitting cathode to a temperature that decreases the electron emission current emitted from the at least one emitting cathode, to reduce sputtering, when a process pressure passes a given pressure threshold. In another embodiment, the at least one spare cathode and the at least one emitting cathode may both be heated to a temperature that is insufficient to emit electrons from the cathodes when a process pressure passes a given pressure threshold or the ionization gauge turns off.

In another embodiment, the control circuitry heats at least two cathodes (e.g., an emitting cathode and a spare cathode) to a temperature that is sufficient to emit electrons from the at least two cathodes. In this manner, a spare cathode may be protected from the coating and poisoning processes. At the same time, the spare cathode and an emitting cathode together may provide sufficient electron emission current.

In yet another embodiment, plural cathodes may be heated to a first temperature to generate electrons. After a process pressure passes a given pressure threshold, the plural cathodes may be heated to a second temperature less than the first temperature. Ions formed by impact between the electrons and the gas atoms and molecules may be collected both before and after the process pressure passes the given pressure threshold. The plural cathodes may be heated to the second temperature to provide a lower electron emission current, for example, between 1 μA and 90 μA. The plural cathodes may also be heated to the second temperature to reduce sputtering of ion gauge components.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a table illustrating different modes of operation of an embodiment of a hot-cathode ionization gauge employing two cathodes.

DETAILED DESCRIPTION OF THE INVENTION

A description of preferred embodiments of the invention follows.

Figure 1:
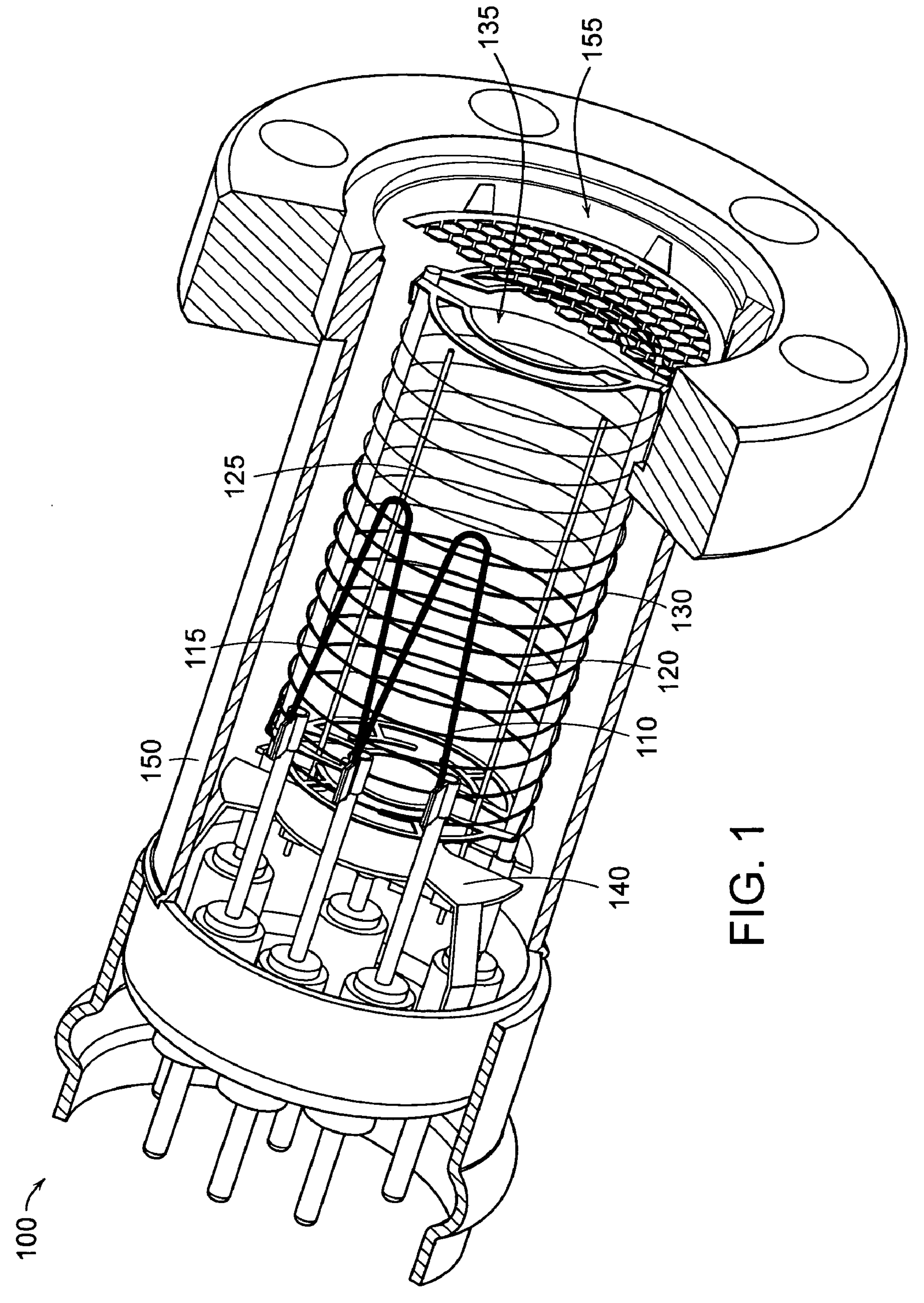
FIG. 1 is a perspective view of an embodiment of a hot-cathode ionization gauge employing two cathodes.

FIG. 1 is a perspective view of a hot-cathode ionization gauge 100 employing two cathodes 110, 115 according to one embodiment. The hot-cathode ionization gauge 100 includes a cylindrical wire grid 130 (i.e., anode) defining an ionization volume 135 (i.e., anode volume). Two collector electrodes 120, 125 are disposed within the ionization volume 135 and the two cathodes 110, 115 are disposed external from the cylindrical wire grid 130. The above elements of the hot-cathode ionization gauge 100 are enclosed within a tube or envelope 150 that opens into a process chamber via port 155. The hot-cathode ionization gauge 100 also includes a shield 140, such as a stainless steel shield, to shield various electronics components of the ionization gauge from ionized process gas molecules and atoms and other effects of charged particles.

An ionization gauge controller (not shown) may heat one cathode 110 (e.g., an "emitting" cathode) to a controlled temperature of about 2000 degrees Celsius to produce a specified electron emission current, such as 100 μA or 4 mA. The ionization gauge controller may not heat the other cathode 115 (e.g., a "non-emitting" or "spare" cathode) so that it may be used as a spare when the emitting cathode becomes inoperative. However, as described above, the electron emission characteristics of the spare cathode may degrade and the spare cathode may eventually become inoperative because gaseous products from a process in a vacuum chamber or sputtered material from the gauge may deposit on the spare cathode or process gasses may react with the spare cathode material.

In one embodiment, the spare cathode is instead heated to a temperature above room temperature while the emitting cathode is heated to emit electrons from the cathode surface. The spare cathode is heated to a temperature that is sufficient to evaporate any material that coats or deposits on the spare cathode and to decrease chemical interactions between the spare cathode and process gasses. The spare cathode, for example, may be heated to a temperature between about 200 to 1000 degrees Celsius depending on the process environment to which the spare cathode is exposed while the emitting cathode is operated. As a result, the spare cathode is maintained in a nearly clean condition and is ready to be used as a spare should the emitting cathode become inoperative.

The spare cathode, however, is heated to a temperature that is significantly less than the emitting temperature so that the spare cathode does not wear out for metallurgical reasons, such as embrittlement from grain growth due to long operation at these high temperatures. Also, there are optimum temperatures to decrease or prevent chemical poisoning of the spare cathode depending on the process gases. Thus, by heating the spare cathode to an optimum temperature above room temperature but significantly less than the emitting temperature, the overall operation and life of the ionization gauge is enhanced.

Figure 2:
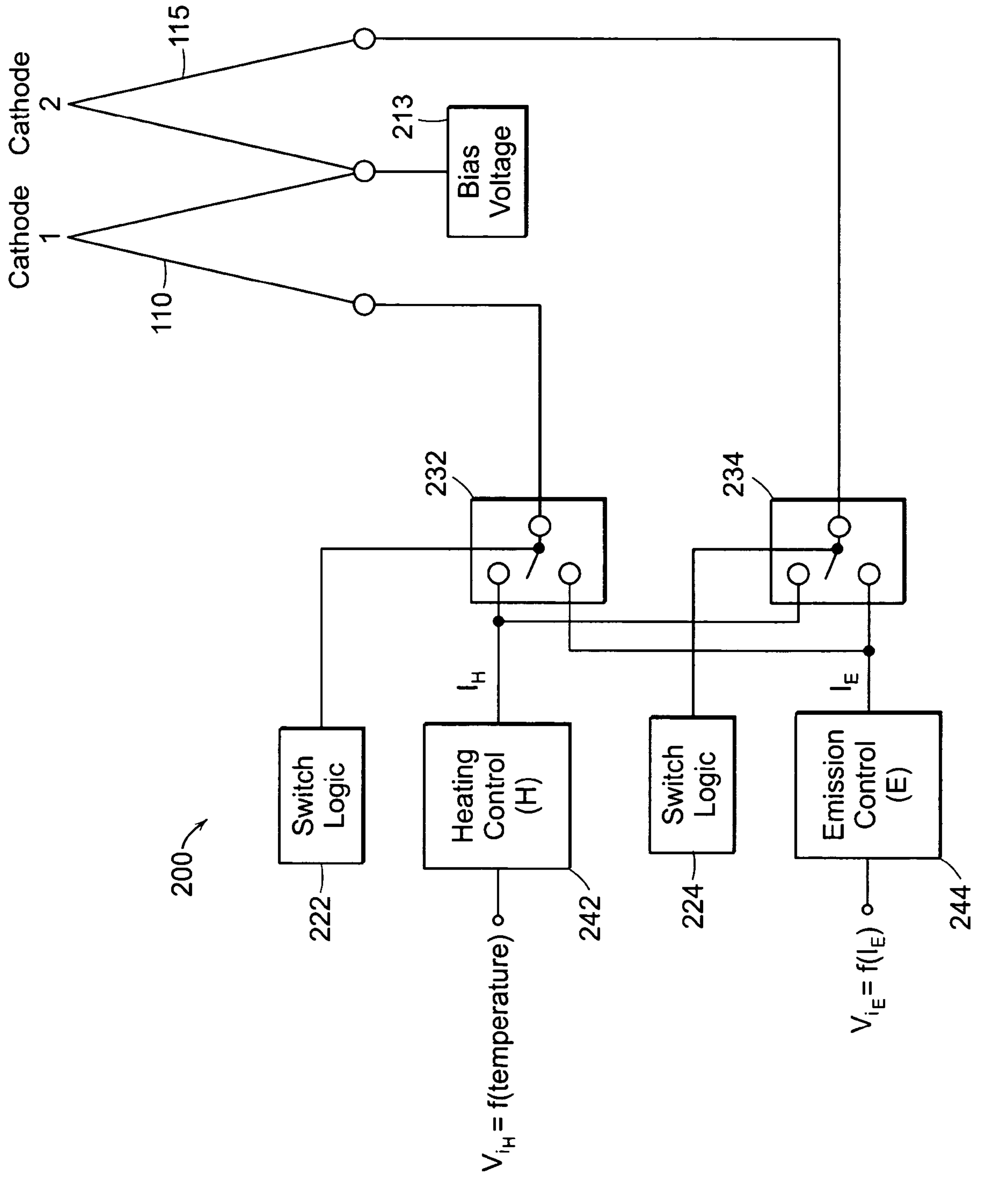
FIG. 2 is a circuit block diagram of an embodiment of a hot-cathode ionization gauge control electronics.

FIG. 2 is a circuit block diagram of hot-cathode ionization gauge circuitry 200 that may be used to operate two cathodes 110, 115 according to one embodiment. An output of a first switch 232 connects to a first end of a first cathode 110 and an output of a second switch 234 connects to a first end of a second cathode 115. A power supply 213 connects to and may supply a bias voltage to both a second end of the first cathode 110 and a second end of the second cathode 115. A heating control unit 242 and an emission control unit 244 both connect to respective inputs of the first switch 232 and the second switch 234.

The heating control unit 242 receives a voltage signal $V_{i_H}$ that represents a desired temperature to heat either or both cathodes 110, 115. The voltage signal $V_{i_H}$ may be provided by a pre-programmed processor (not shown) or by an operator via a processor (not shown). The heating control unit 242 then heats either or both cathodes 110, 115 to the desired temperature by providing a heating current $i_H$ to either or both cathodes 110, 115 via the first switch 232 and the second switch 234, respectively.

The emission control unit 244 receives a voltage signal $V_{i_E}$ that represents a desired electron emission current to emit from either or both cathodes 110, 115. The emission control unit 244 then provides an electron emission current $i_E$ to either or both cathodes 110, 115 via the first switch 232 and the second switch 234, respectively. Because the processes described above may degrade As a result, either or both cathodes 110, 115 may heat to a temperature that is significantly greater than the desired temperature regulated by the heating control unit 242.

A first switch logic unit 222 and a second switch logic unit 224 communicate with and control the first switch 232 and the second switch 234, respectively. The first switch logic unit 222 controls the first switch 232 to connect the first cathode 110 to either the heating control unit 242 or the emission control unit 244. Likewise, the second switch logic unit 224 controls the second switch 234 to connect the second cathode 115 to either the heating control unit 242 or the emission control unit 244. The first switch logic unit 222 and the second switch logic unit 224 may be implemented as computer instructions executed in an ionization gauge processor.

FIG. 3 is a table 300 illustrating different modes of operation of a dual-filament hot-cathode ionization gauge according to one embodiment. The column labeled "Cathode" (311) indicates the cathodes being operated. In this embodiment, "Cathode 1" and "Cathode 2" (e.g., the first cathode 110 and the second cathode 115 in FIG. 2) are being operated. The columns labeled I-IV (323-329) indicate example modes of operation of the cathodes or "cathode status options" (311). In mode I (323), Cathode 1 is heated to a temperature to emit electrons from its surface and is thus labeled an "emitting" cathode. Cathode 2, however, is only heated so that it does not emit electrons and thus is labeled a "heated only" cathode.

In mode 11 (325), the cathodes switch roles: Cathode 2 is the "emitting" cathode and Cathode 1 is the "heated only" cathode. In mode III (327), both Cathode 1 and Cathode 2 are operated as "heated only" cathodes. Finally, in mode IV (329), both Cathode 1 and Cathode 2 are operated as "emitting" cathodes. In all modes, Cathode 1 and/or Cathode 2 can be operated at either low emission to reduce sputtering of ionization gauge components or at standard emission. For example, in mode IV (329), Cathode 1 and Cathode 2 may be heated to a first temperature to provide 4 mA of electron emission current when a process pressure is in the range of ultra high or high vacuum. If the process pressure increases and exceeds a given pressure threshold, such as $1\times10^{-5}$ Torr, Cathode 1 and Cathode 2 may be heated to 20 μA to reduce the sputtering of ionization gauge components as described above. If the process pressure then decreases and passes another given pressure threshold, such as $5\times10^{-6}$ Torr, Cathode 1 and Cathode 2 may again be heated to 4 mA.

In various embodiments, the ionization gauge controller may heat the spare cathode in several ways. First, the ionization gauge controller may maintain the spare cathode at a constant temperature that is lower than the temperature of the emitting cathode. Second, the ionization gauge controller may power the spare cathode with periodic voltages, i.e., pulsed, duty-cycled, or alternating, to heat the spare cathode to a temperature that is less than the temperature of the emitting cathode. This further increases the lifetime of the spare cathode because it is heated less often than if the spare cathode was maintained at a constant temperature.

Third, the ionization gauge controller may alternate between maintaining the spare cathode at a constant temperature and periodically heating the spare cathode to a constant temperature. For example, at high pressures, where the emitting function of the spare cathode is more prone to being degraded by process gases, the ionization gauge controller could heat the spare cathode to the constant temperature, and at low pressures, where the spare cathode is less prone to being degraded by process gases, the ionization gauge controller could periodically heat the spare cathode.

In some applications, a process may continue up to 100 mTorr or 1 Torr, after the ionization gauge turns off. When the ionization gauge is turned off, there is no longer any sputtering of the tungsten or stainless steel because there are no ions being generated which bombard surfaces and sputter the metal off. However, both cathodes continue to be exposed to contaminating process gases that can deposit on the cathodes or chemically react with the cathode. Thus, in another embodiment, if the ionization gauge turns off and the process pressure passes or exceeds a given pressure threshold, both cathodes may be heated to a temperature that is not sufficient to emit electrons from both cathodes. In this way, the cathodes are maintained free of contaminating process gases that may deposit on the cathodes. For example, after the ionization gauge turns off at 10 or 20 mTorr, the ionization gauge controller may heat both the spare and emitting cathodes to the non-emitting temperature until the process environment reaches a higher pressure level, such as 100 mTorr or 1 Torr.

In another embodiment, an emission control unit (e.g., the emission control unit 244 in FIG. 2) may reduce the power provided to heat the emitting cathode in order to decrease the electron emission current from the emitting cathode at higher pressures. Reducing the electron emission current at higher pressures reduces the quantity of ions produced and, as a result, reduces sputtering and its effects on the surfaces of the ionization gauge. In an example embodiment, the electron emission current may be reduced from 100 μA to 20 μA at high pressures. The emission control unit may also reduce the power provided to heat two or more cathodes, such as the emitting cathode 110 and the spare cathode 115.

Figure 4:
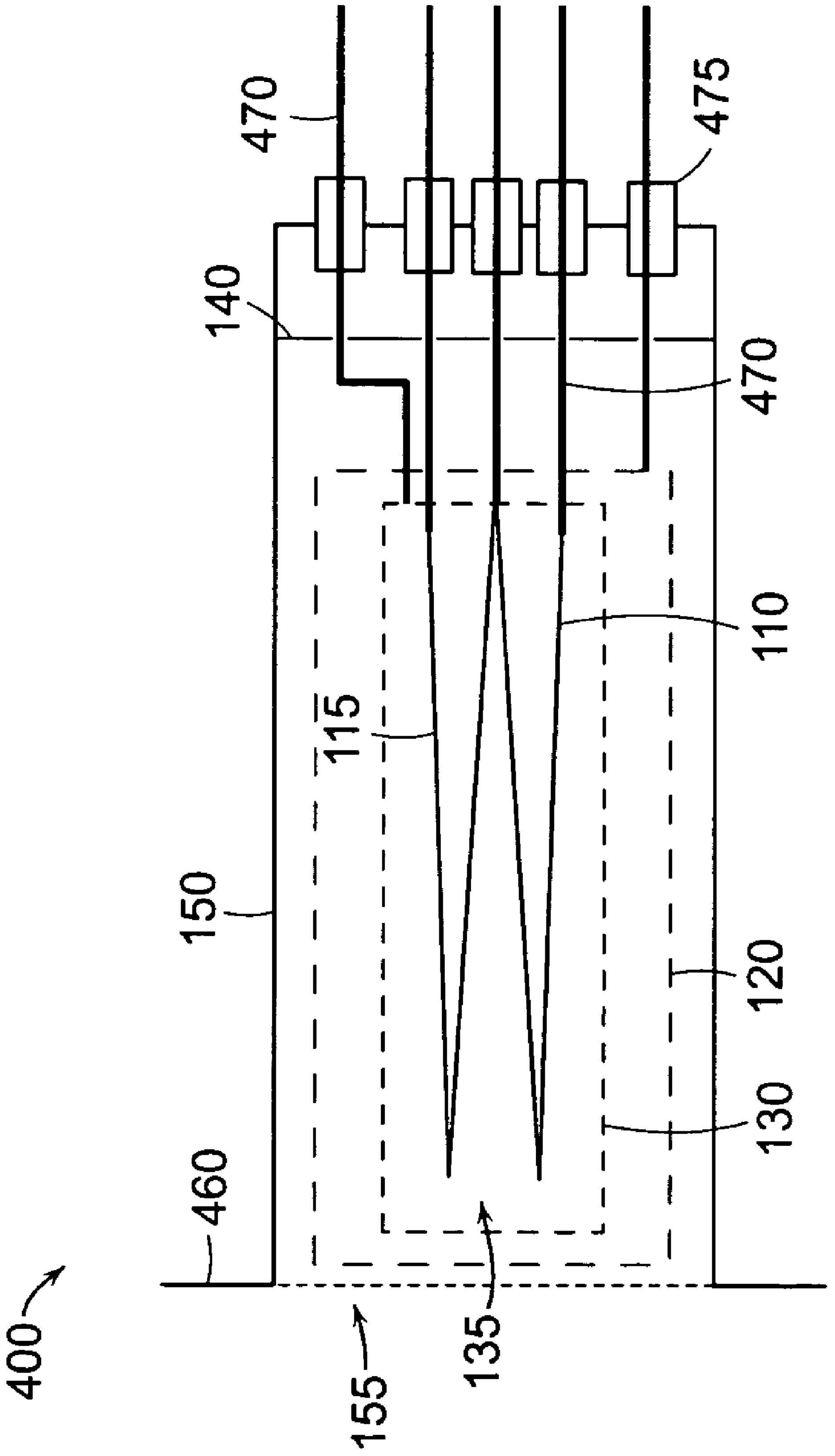
FIG. 4 is a cross-sectional view of an embodiment of a triode gauge employing two cathodes.

FIG. 4 is a cross-sectional view of an embodiment of a non-nude triode gauge 400 which also employs two cathodes 110, 115. The non-nude triode gauge 400 includes two cathodes 110, 115, an anode 130 which may be configured as a cylindrical grid, a collector electrode 120 which may also be configured as a cylindrical grid, feedthrough pins 470, feedthrough pin insulators 475, an enclosure 150, and a flange 460 to attach the gauge to a vacuum system. The anode 130 defines an anode volume 135. Thus, the triode gauge 400 includes similar components and operates in a similar way as the standard B-A gauge described above with reference to FIG. 1, but the triode gauge's cathodes 110, 115 are located within the anode volume 135 and the triode gauge's collector 120 is located outside of the anode volume 135. The methods and control circuitry described above with reference to FIG. 2 and FIG. 3 may be applied to the two cathodes 110, 115 of the triode gauge 400 in order to extend its operational lifetime.

Alternating between turning on one cathode and turning off the other may increase the life of the cathodes by about 1.1-1.2 times in certain applications. However, embodiments of the ionization gauge presented herein may increase the life of the cathodes in certain applications by a significant factor up to nearly double.

An additional advantage of the above embodiments is that the existing components of the multi-cathode ionization gauge tube do not have to be changed. The control algorithm for operating the cathodes may simply be changed such that the spare cathode is heated to a temperature less than the temperature of the emitting cathode.

While this invention has been particularly shown and described with references to preferred embodiments thereof, it will be understood by those skilled in the art that various changes in form and details may be made therein without departing from the scope of the invention encompassed by the appended claims.

It should be understood that all or a portion of the methods or elements disclosed above may be implemented in hardware, software, firmware, or any combination thereof.

It should also be understood that more than two cathodes, more than one collector, and more than one anode of varying sizes and shapes may be employed in example ionization gauges according to other embodiments.

What is claimed is:

1. An ionization gauge, comprising:

at least two cathodes;

an anode defining an anode volume;

an ion collector electrode; and control circuitry coupled to the at least two cathodes and configured to heat at least one cathode to a first temperature and configured to heat at least one other cathode to a second temperature that is insufficient to emit electrons from the at least one other cathode.

2. The ionization gauge of claim 1, wherein the ion collector electrode is disposed inside of the anode volume and the at least two cathodes are disposed outside of the anode volume.

3. The ionization gauge of claim 1, wherein the ion collector electrode is disposed outside of the anode volume and the at least two cathodes are disposed inside of the anode volume.

4. The ionization gauge of claim 1, wherein the first temperature is sufficient to emit electrons from the at least one cathode and the ion collector electrode is configured to collect ions formed by impact between the electrons and gas atoms and molecules.

5. The ionization gauge of claim 4, wherein the second temperature is between about 200° C. and 1000° C.

6. The ionization gauge of claim 4, wherein the control circuitry alternates between: (i) heating the at least one cathode to the first temperature and the at least one other cathode to the second temperature and (ii) heating the at least one other cathode to the first temperature and the at least one cathode to the second temperature, the second temperature being insufficient to emit electrons from the at least one cathode.

7. The ionization gauge of claim 4, wherein the second temperature is a variable temperature.

8. The ionization gauge of claim 4, wherein the control circuitry constantly heats the at least one other cathode to the second temperature.

9. The ionization gauge of claim 4, wherein the control circuitry periodically heats the at least one other cathode to the second temperature.

10. The ionization gauge of claim 4, wherein the control circuitry alternates between: (i) constantly heating the at least one other cathode to the second temperature and (ii) periodically heating the at least one other cathode to the second temperature.

11. The ionization gauge of claim 4, wherein the second temperature is sufficient to decrease the amount of material that deposits on the at least one other cathode or decreases the chemical interaction between a process gas and a material of the at least one other cathode.

12. The ionization gauge of claim 4, wherein the control circuitry is further configured to heat the at least one cathode to a temperature that decreases the electron emission current emitted from the at least one cathode in response to a process pressure passing a given pressure threshold.

13. The ionization gauge of claim 1, wherein the control circuitry is further configured to heat the at least two cathodes to the second temperature in response to a process pressure passing a given pressure threshold or the ionization gauge turning off.

14. A method of measuring a gas pressure from gas molecules and atoms, comprising:

heating at least one cathode to a first temperature to generate electrons;

heating at least one other cathode to a second temperature less than the first temperature, the second temperature being insufficient to emit electrons from the at least one other cathode;

collecting ions formed by impact between the electrons and the gas atoms and molecules in an anode volume defined by an anode.

15. The method of claim 14, wherein the second temperature is between about 200° C. and 1000° C.

16. The method of claim 14, further comprising alternating between: (i) heating the at least one cathode to the first temperature and the at least one other cathode to the second temperature and (ii) heating the at least one other cathode to the first temperature and the at least one cathode to the second temperature, the second temperature being insufficient to emit electrons from the at least one cathode.

17. The method of claim 14, wherein the second temperature is a variable temperature.

18. The method of claim 14, wherein heating the at least one other cathode to the second temperature includes constantly heating the at least one other cathode to the second temperature.

19. The method of claim 14, wherein heating the at least one other cathode to the second temperature includes periodically heating the at least one other cathode to the second temperature.

20. The method of claim 14, wherein heating the at least one other cathode to the second temperature includes alternating between: (i) constantly heating the at least one other cathode to the second temperature and (ii) periodically heating the at least one other cathode to the second temperature.

21. The method of claim 14, wherein the second temperature is sufficient to decrease the amount of material that deposits on the at least one other cathode or decreases the chemical interaction between a process gas and a material of the at least one other cathode.

22. The method of claim 14, further comprising heating the at least one cathode to a temperature that decreases the electron emission current emitted from the at least one cathode in response to a process pressure passing a given pressure threshold.

23. A method of measuring a gas pressure from gas molecules and atoms, comprising:

heating at least one of plural cathodes to a first temperature to generate electrons;

heating the plural cathodes to a second temperature less than the first temperature in response to a process pressure passing a given pressure threshold, the second temperature being insufficient to emit electrons from the plural cathodes;

collecting ions formed by impact between the electrons and the gas atoms and molecules.

24. The method of claim 23, wherein heating the plural cathodes to the second temperature reduces sputtering of ionization gauge components.

* * * * *